United States Patent [19]

Eisentraut

[11] 3,775,615

[45] Nov. 27, 1973

[54] METHOD OF DETERMINING THYROID FUNCTION
[75] Inventor: Anna M. Eisentraut, Dallas, Tex.
[73] Assignee: Nuclear-Medical Laboratories Inc., Dallas, Tex.
[22] Filed: July 6, 1971
[21] Appl. No.: 160,115

[52] U.S. Cl.......... 250/83 SA, 23/230 B, 250/106 T
[51] Int. Cl. ............................................ G21h 5/02
[58] Field of Search .................... 250/83 SA, 106 T; 23/230 B

[56] References Cited
UNITED STATES PATENTS
3,451,777  6/1969  Di Giulio ...................... 250/83 SA
3,507,618  4/1970  Murty et al. .................... 250/83 SA Primary Examiner—Walter Stolwein
Assistant Examiner—Davis L. Willis
Attorney—Richards, Harris & Hubbard

[57] ABSTRACT

An improved method is provided for measuring the total amount of thyroid hormone within a body fluid. The procedure includes an extraction step whereby thyroid hormone (thyroxine) is initially extracted from a blood sample by first diluting the blood sample from 1.5 to 6 times its initial volume with a nonionic aqueous diluent and thereafter extracting the thyroxine with a solvent such as alcohol. The extracted thyroxine is then combined with a known amount of thyrobinding globulin and a radioisotope labeled thyroid hormone to form an equilibrated solution. The free thyroid hormone is extracted from the resulting equilibrated solution with a particulate inorganic crystalline lattice sorbent material.

This invention relates to diagnostic tests for determining the level of thyroid hormone within a body fluid. In another aspect, this invention relates to an improved method for measuring total thyroid hormone within a body fluid. In a further aspect, this invention relates to an improved technique for extracting thyroid hormone from a blood serum sample.

15 Claims, No Drawings

METHOD OF DETERMINING THYROID FUNCTION

Various diagnostic tests are known in the art for determining thyroid function. These tests include the basal metabolism test, the thyroid uptake test and various colorimetric and chemical procedures for determining the level of thyroxine iodine in the blood. Among the most accurate tests available are the diagnostic tests which utilize radioisotope labeled hormone to indirectly determine the level of thyroid hormones, thyroxine ($C_{15}H_{11}I_4NO_4$), and triiodothyronine ($C_{15}H_{12}I_3NO_4$) present in body fluids. Specifically, these tests include a test commonly referred to as the T-3 Test which measures the unsaturated binding capacity of thyrobinding globulin and other proteins within a body fluid such as blood, and the test commonly referred to as the T-4 Test which measures the total quantity of hormone within a sample of blood serum.

Both of these tests include the steps of adding the radioisotope labeled hormone to a solution containing a sample of hormone produced within the body and thyrobinding globulin, separating the resulting thyrobinding globulin containing bound hormone from the resulting unbound hormone, and counting the radioactivity of either the bound or unbound hormone. This counting procedure will indirectly indicate the amount of endogenous hormone which is bound to the natural globulin and protein bounding sites within the blood.

Thus, both the T-3 and T-4 Tests depend for their accuracy upon the efficient separation between the bound and unbound thyroid hormone in the test sample. The conventional methods for removal of these hormones include ion exchange resins such as the ion exchanger having strongly basic amino or quatenary ammonium groups as disclosed in U.S. Pat. No. 3,414,383. These organic ion exchange resins can be either in loose forms, or incorporated in polyurethane sponges as disclosed in U.S. Pat. No. 3,206,602, or enclosed in porous bags or the like. Another such conventional method involves a selective adsorption of the free hormones by charcoal which has been coated with suitable proteins or molecular sieves such as sephadex.

Recently, an improved thyroid hormone test has been developed and is set forth in copending application Ser. No. 846,289 filed on July 30, 1969. This new test includes sorbing the free hormones on a particulate, inorganic crystalline lattice material, such as magnesium silicate, for example. This new test is neither time nor temperature dependent, in that it can be carried out at any convenient room temperature over any convenient time period to obtain very accurate results. The sorbent will quickly and efficiently bind only the free or nonprotein bound thyroid hormone within a sample fluid. This test normally includes the admixing of the dry sorbent material with a suitable solution, such as a barbital buffer solution containing both the free hormones and the hormones bound to the natural binding sites (thyrobinding globulin and other proteins), thoroughly admixing until sorption of the free hormones and then separation of the sorbent from the resultant supernatant fluid.

Due to several factors which are discussed below, the T-3 Test has generally become more widely accepted than the T-4 Test. However, in order to obtain a complete indication of the thyroid activity within the body, it is generally necessary to correlate the results of the T-3 Test with the value of the total thyroid hormone content in the blood. Specifically, it is known that thyroid hormones do not exist freely in large amounts in the plasma but are bound to specific protein fractions therein. The hormones are transported throughout the body in this bound form. The binding strength of the protein fractions is generally constant within narrow limits in most humans. Thus, a measure of the unsaturated binding capacity of a sample by using a T-3 Test will generally give an indication of the quantity of thyroid hormone present in the blood. However, the T-3 Test does not determine the total quantity of thyroid hormone in the blood, and certainly does not directly measure the amount or quantity of the natural binding sites within the blood. Thus, in order to get a complete indication of thyroid activity, it is necessary to correlate the measurement of unsaturated binding capacity for thyroid hormone with the total quantity of thyroid hormone in a sample. The T-4 Test, which is a measure of the total amount of thyroid hormone in the blood can be used in conjunction with the T-3 Test in order to get a true measure of the thyroid function.

Conventional T-4 Tests include the steps of initially extracting the thyroid hormone from a sample of blood serum. This extraction step is usually accomplished with an organic solvent and serves the purpose of isolating the thyroid hormone from the proteins within the blood. Various extractants which have been utilized include alcohol mixed with alkaline reagents such as ammonium hydroxide, materials such as dimethoxypropane, and the like. However, the safest, most reproducible extractant materials which have been conventionally used include the lower aliphatic alcohols, and preferably ethanol or denatured alcohol Formula 3A. After the extraction, the extractant is normally placed within a test tube in a temperature controlled zone and the organic solvent evaporated therefrom to leave a dry residue of the thyroid hormone. Next, the thyroid hormone is solubilized usually within a buffer containing known quantities of thyrobinding globulin and a tracer quantity of radioisotope-labeled thyroid hormone. Next, a sorbent material is utilized to separate the free thyroid hormone from the resulting bound thyroid hormone within the sample. Either the sorbent or the resulting supernatant is measured by suitable means, such as with a scintillation well counter. Thereafter, the total amount of thyroid hormone within the sample is determined by correlation with a standard curve which is based upon radioactive counts present in samples containing known quantities of thyroid hormone.

Heretofore, most conventional T-4 Tests have not been extremely reliable because of the failure to obtain reproducible and correlatable results. One of the problems in these tests is that the percent recovery of thyroid hormones from the initial extraction step must be calculated and applied to the standard curve once the test is taken. The percent recovery varies greatly. When utilizing an alcohol such as ethanol or Formula 3A, the most widely used and acceptable extractant heretofore known in the art, the mean recovery value of the thyroid hormone is 75 percent. However, the overall recovery range is 75 percent ± 13.5 percent, or a range of from 61.5 to 88.5 percent. The recovery of the thyroid hormone varies from day to day and certainly with each serum which is tested. Because of the unpredictability of the recovery value during the extraction step authorities, such as Ekins et al. Clin. Biochem. 2 253, 1959 feel that it is mandatory to measure the individual recovery on each serum in order to obtain accurate results with the T-4 Test. This additional procedure of determining the individual recovery for each serum is considered prohibitive in most clincal circumstances.

The unpredictable extraction efficiency described above, coupled with the burdensome and tedious techniques which must be followed with conventional T-4 Tests whereby the temperature and time must be closely controlled during the sorption steps have resulted in the T-4 Test not being widely accepted.

Therefore, one object of this invention is to provide an improved T-4 Test method.

Another object of this invention is to provide an improved technique for separating thyroid hormone from blood serum in a T-4 diagnostic test.

A further object of this invention is to provide an improved T-4 Test method which yields highly reproducible results, which test is neither time nor temperature dependent, and wherein the recovery value of the thyroid hormone from the blood serum is stable and dependable.

According to the invention, a novel T-4 Test procedure is provided which includes the basic step of extracting thyroid hormone from a body fluid by initially diluting the body fluid from about 1.5 to about 6 times its original volume with a nonionic aqueous diluent and thereafter effecting the extraction of the thyroid hormone with an organic solvent, such as an alcohol. This improved extraction technique yields extracts which are clear, and the average recovery value is about 93 percent with an overall range of ± 2 percent of the average.

According to a preferred specific embodiment of this invention, after the thyroid hormone has been extracted in accordance with the above-described procedure, and an equilibrated solution is formed between the extracted hormone, thyrobinding globulin, and a tracer quantity of radioisotope labeled thyroid hormone, the resulting free thyroid hormone is extracted from the equilibrated solution with the particulate inorganic crystalline lattice sorbent material of said copending U.S. Pat. application Ser. No. 846,289. The resulting sorbent material containing sorbed thyroid hormone is separated from the resultant supernatant and either of these is counted such as in a scintillation well counter to determine the amount of free labeled thyroid hormone therewithin. This combined test yields highly predictable, reliable, and correlatable results.

The nonionic aqueous diluent which is utilized in the extraction step of the subject invention can be any aqueous solution which is not strongly ionic and which will not result in the diluted serum having a strongly alkaline pH (generally a pH above about 7.4). The preferred nonionic aqueous diluent is distilled water. Examples of other nonionic aqueous diluents include normal saline or buffer solutions of barbital, glycine, or other constituents which are nondeleterious to the precipitation reaction. It has been found that the improved extraction efficiencies produced by the extraction process of the present invention cannot be obtained by merely using greater amounts of conventional extraction solvents. Thus, a solvent material will not effectively function as a diluent within the scope of this invention, and dilution of blood serum with solvents only yields conventional results (overall recovery is approximately 75 percent ± 13 percent). Therefore, it is necessary that the aqueous diluent not serve to precipitate or floculate the proteins but only to function as a diluent for the serum. A sufficient quantity of the nonionic aqueous diluent is added to the body fluid (serum) to dilute the fluid from about 1.5 to about 6 times its initial volume for most extractions, it is preferred that the serum be diluted to about twice its original volume with the nonionic aqueous diluent.

Any suitable organic solvent, such as alcohol, which is nondeleterious to the extraction process, can be utilized to extract thyroid hormone from the diluted serum. The preferred solvents are monohydric and dihydric alcohols. For example, ethanol, methanol, propanol, butanol, diethylene glycol, mixtures thereof, and the like, can be utilized as the extractant solvent within the scope of the invention. The most preferred solvent comprises at least 90 weight percent ethanol. Sufficient alcohol should be admixed with the diluted serum to yield a final solvent concentration in the resulting mixture of at least about 60 percent by volume, generally from about 60 percent by volume to about 90 percent by volume.

An example of a typical analysis procedure of this invention comprises initially diluting 0.4 milliliter of sample serum with 0.4 milliliter of distilled water. After the distilled water and sample serum are thoroughly admixed, 1.6 milliliters of alcohol solvent is added thereto. Next, the constituents are mixed for a few seconds to cause precipitation of serum proteins and other unwanted constituents thereby leaving the thyroxine in solution.

Next, an aliquot (for example, 0.8 milliliter ) of the extract containing the thyroid hormone is pipetted into a shallow well sample receptacle. The sample receptacle is placed on a flat surface and the solvent is removed by simply passing a gas such as an airstream over the opening. For example, an airstream heated to about 45°C will cause complete evaporation of the alcohol solvent within about 30 to 45 minutes.

After the solvent is completely removed from the sample receptacle by evaporation to leave a dried deposit of thyroxine thereupon, the thyroxine deposit is solubilized with buffer solution. Any suitable aqueous buffer material can be used in the scope of this invention, such as for example, a barbital buffer solution (diethyl barbituic acid, pH 8.6, 0.075M), or an aqueous glycine buffer solution (pH 6, 0.2M). Specifically, 1 milliliter of the buffer solution can be used to solubilize the dry deposit of thyroxine.

After the thyroxine is solubilized by the buffer solution, a known quantity of thyrobinding globulin and radioisotope labeled thyroid hormone are mixed therewith. Examples of suitable sources of thyrobinding globuline include whole human serum and some animal serum. The most preferred source of thyrobinding globulin is a lyophylyzed commercially prepared human alpha globulin fraction. It is preferred that the albumin contamination within the thyrobinding globulin fraction be as minimal as possible to assure assay sensitivity. In this example, 0.4 milliliter of barbital buffer pH 8.6 can be added containing 1 weight percent of the human alpha globulin. A tracer amount of radioisotope labeled thyroid hormone is also added to the buffer at this time. Any radioactive isotope of iodine, tritium, or carbon can be used. It is preferred that a hormone be utilized which is labeled with either radioactive $I^{131}$ or $I^{125}$.

Once the thyrobinding globulin and the radioactive isotope are thoroughly admixed in the buffer fluid containing the solubilized thyroxine, a sorbent material is intimately contacted therewith. Any suitable sorbent material which is nondeleterious to the system, but will separate the free thyroxine from the protein bound thyroxine can be used in the scope of this invention. However, more effective and reproducible results are obtained by using a particulate inorganic crystalline lattice sorbent material. Suitable inorganic crystalline lattice sorbent material which can be used within the scope of this invention includes the phosphates, oxides, hydroxides, silicates, aluminates, carbonates, and sulfates, of the metallic elements in Groups IA, IIA, IIIA, IIB and VIII of the periodic Table as illustrated on page B-2 of the *Handbook of Chemistry and Physics*, Chemical Rubber Publishing Company (1964). Examples of suitable materials include calcium carbonate, calcium phosphate, calcium oxide, calcium hydroxide, calcium silicate, calcium aluminate, calcium sulfate, magnesium carbonate, magnesium phosphate, magnesium oxide, magnesium hydroxide, magnesium silicate, magnesium aluminate, magnesium sulfate, aluminum carbonate, aluminum phosphate, aluminum oxide aluminum hydroxide, aluminum silicate, aluminum sulfate, potassium carbonate, potassium phosphate, potassium oxide, potassium hydroxide, potassium silicate, potassium aluminate, potassium sulfate, iron carbonate, iron phosphate, iron oxide, iron hydroxide, iron silicate, iron aluminate, iron sulfate, barium carbonate, barium phosphate, barium oxide, barium hydroxide, barium silicate, barium aluminate, barium sulfate, zinc carbonate, zinc phosphate, zinc oxide, zinc hydroxide, zinc silicate, zinc aluminate, zinc sulfate, and mixed salts thereof.

Some specific examples of commonly occurring materials which can be used within the scope of this invention include: Opal, $Si(OH)_4 + SiO_2$; Waterglass, $Si_4O_9 \cdot Na_2$; Kaolinite, $Al_2(SiO_5)(OH)_4$; Dickite, $Al_2(Si_2O_5)(OH)_4$; Nacrite, $Al_2(Si_2O_5)(OH)_4$; Metahalloysite, $Al_2(Si_2O_5)(OH)_4$; Halloysite, $Al_2(SiO_3)(OH)_3$; Attapulgite, $Mg_3(Si_4O_{10})(OH)_2(OH) \cdot 2H_2O$, $Al(Si_4O_{10})(OH)_2$; Pyrophyllite, $Al_2(Si_4O_{10})(OH)_2$; Talc, $Mg_3(Si_4O_{10})(OH)_2$; Montmorillonite, $Al_2(Si_4O_{10})(OH)_2 \cdot xH_2O$, $Mg(Si_4O_{10})(OH_2 \cdot xH_2O)$; Nontromite, $Fe_2(Si_4O_{10})(OH)_2 \cdot xH_2O$, $Mg(Si_4O_{10})(OH)_2 \cdot xH_{20}$; Beidellite, $Al_2(Si_4AlO_{10})(OH)_2 \cdot xH_2O$, $Mg(Si_4AlO_{10})(OH)_2(xH_{20})$; Saponite, $Mg_3(Si_4O_{10})(OH)_2 \cdot xH_2O$, Illite, $K_y \cdot Al_2(Si_{4-y})O_{10}$, $Fe_2 \cdot Mg_2 \cdot Mg_3(Si_{4-y}Al_y)O_{10}$; Muscovite, $K \cdot Al_2(AlSi_3O_{10})(OH)_2$; Paragonite, $Na \cdot Al_2(AlSi_3O_{10})(OH)_2$; Phlogonite, $K \cdot Mg_3(AlSi_3P_{10})(OH)_2$; Biotite, $K \cdot Mg_1Fe)_3(AlSi_3O_{10})(OH)_2$; Margarite, $Ca \cdot Al_2(Al_2 \cdot Si_3 \cdot _{010})(OH)_2$.

The most preferred inorganic crystalline sorbent materials include the silicates, particularly magnesium silicate and aluminum silicate. Other preferred sorbent materials are calcium phosphate, silicic acid, aluminum hydroxide, calcium oxide, and magnesium carbonate and magnesium oxide.

Ideally, the size of the crystalline sorbent material should allow rapid centrifugation. Also the material should remain packed while inverted and yet be easily resuspended. Thus, the preferable diameter range is $10^{-4}$ to $10^{-3}$ centimeters, although the sorbent material can have a size of $10^{-7}$ to $10^{-1}$ centimeters.

In this example, 25 milligrams of magnesium silicate crystalline lattice sorbent material can be added to the buffer solution. The particular inorganic crystalline lattice sorbent material is thoroughly admixed in the solution for about 30 seconds and then allowed to set for about 4 minutes or more to allow the sorbent to bind the free thyroid hormone in the buffer solution.

After the binding step, the tube containing the sorbent material in buffer solution is centrifuged for 2 to 4 minutes, the supernatant separated from the sorbent, and either the resulting supernatant or the sorbent, preferably the sorbent, is counted in a scintillation well counter. The reading of the scintillation counter is compared to the total number of counts contained within the tracer amount of radioactive isotope labeled thyroid hormone to obtain percent recovery value. The total counts per minute are determined by measuring the total counts of the tracer quantity of radioactive isotope labeled thyroid hormone within a quantity of buffer material equal in volume to that quantity of material (whether sorbent material or liquid buffer material) which is being counted in the scintillation well counter from each test sample. The percent recovery values are then correlated with standard values obtained by measuring percent recovery of standard samples containing known amounts of thyroid hormone to thereby determine the amount of thyroid within each sample.

The preparation of the standard samples and the counting techniques are preferably carried out by the same procedure as described above for the unknowns. Specifically, a standard serum sample containing 20 micrograms of total serum thyroxine per hundred milliliters of serum are prepared. The standard is pooled normal serum which has been assayed by carefully controlled independent methods. Thereafter, pure crystalline thyroxine diluted in 0.25 percent bovine albumin in water is added to the serum to yield a final total concentration of 20 $\mu$g percent. Preferably, each of the test kits of the subject invention is provided with this standard serum containing a measured quantity of thyroxine which would be equivalent to 0, 5, 10, 15, and 20 grams percent serum when extracts of 0, 100, 200, 300, and 400 microliters thereof are dried.

After the standard serum is prepared, it is then processed as described above from the extraction step through the counting step in the scintillation well counter. When the standards are processed in this manner, any possible errors are eliminated, such as daily variations often noted in recovery of thyroxine in the extraction step. The extraction of the standard serum automatically nullifies such differences. In addition, the extraction loss as described above (approximately 7 percent with the present method) need not be applied to the final calculation since the percent recovery in the "pseudo-serum" is almost identical to the average value obtained in the samples and does not vary as do conventional extraction loss values.

Alternately, if desired, one can prepare standards by merely adding known amounts of thyroxine, thyrobinding globulin, and a tracer quantity of radioactive isotope labeled thyroid hormone to a buffer solution, allow equilibration, and then subject the solution to sorption with the sorbent material. When following this procedure to obtain data for the standard curve of percent recovery versus milligrams of thyroxine per milliliters of serum, one will have to apply extraction losses to the sample values finally obtained. When utilizing the present method of extraction, these extraction losses are stable (about 7 percent) and do not vary as do conventional extraction loss values.

The following examples are given to better facilitate the understanding of this invention and is not intended to limit the scope thereof:

EXAMPLE 1

A comparison of the extraction efficiency and reproducibility between a conventional extraction step and the extraction step carried out in accordance with this invention is illustrated in the table below. In each instance, a mixture of 95 percent ethanol, 5 percent methanol, containing an additional 5 percent 2-propanol was utilized as the extractant (Formula 3A). However, when extracting in accordance with this invention, the blood serum was initially diluted with an equal volume of distilled water. In each run, the sample serum was allowed to set for 5 minutes after the alcohol was thoroughly admixed therewith, and thereafter it was centrifuged.

TABLE I

| Serum | Recovery of thyroxine using 1 volume serum + 1 volume distilled $H_2O$ + 8 volumes alcohol | Recovery of thyroxine using 1 volume serum + 2 volumes alcohol |
| --- | --- | --- |
| 1 | 97.9 | 82.9 |
| 2 | 91.8 | 73.4 |
| 3 | 93.4 | 76.0 |
| 4 | 92.5 | 74.3 |

The data clearly shows that when extracting thyroxine in accordance with this invention, the extraction losses are lower and the recovery values are more stable than results obtained by conventional alcohol extraction.

EXAMPLE 2

Several runs were conducted to illustrate the improved extraction technique of this invention using varying amounts of organic solvent. In each run illustrated in Tables II, III, and IV below, the serum sample was initially diluted with an equal volume of water and thereafter admixed with the indicated amount of alcohol (Formula 3A used in Example 1) and then allowed to set for 5 minutes before centrifugation. The results were as follows:

TABLE II

Final alcohol concentration of 66.6 volume % and a ratio of serum to water to alcohol of 1:1:4, respectively

| Serum | % Recovery |
| --- | --- |
| 1 | 93.9 |
| 2 | 93.7 |
| 3 | 92.8 |

TABLE III

Final alcohol concentration of 71.3 volume % with a ratio of serum to water to alcohol of 1:1:5

| Serum | % Recovery |
| --- | --- |
| 1 | 95.6 |
| 2 | 92.2 |
| 3 | 92.9 |

TABLE IV

Final alcohol concentration of 62.5 volume % with a ratio of serum to water to alcohol of 1:1:3

| Serum | % Recovery |
| --- | --- |
| 1 | 88.8 |
| 2 | 90.9 |
| 3 | 89.8 |

It is to be understood that various modifications of this invention will now become apparent to one skilled in the art upon reading this specification, and it is intended to cover such modifications as fall within the scope of the appended claims.

I claim:

1. In a method of determining the amount of thyroid hormone in a serum sample whereby the thyroid hormone is initially extracted from said sample with a solvent, and then removed from said solvent, and thereafter admixed with known amounts of thyrobinding globulin and a radioactive isotope labeled thyroid hormone, and then the resulting mixture is contacted with a sorbent material to remove free thyroid hormone therefrom and either the sorbent or the remaining supernatant is counted in a scintillation counter, the improvement comprising:
stabilizing the amount of recovered thyroid hormone from said serum by diluting said serum from about 1.5 to about 6 times its initial volume with a nonionic aqueous diluent before said extracting.

2. The method of claim 1 wherein said nonionic aqueous diluent is distilled water.

3. The method of claim 1 wherein said organic solvent is an alcohol.

4. The method of claim 3 wherein said organic solvent comprises at least 90% ethanol.

5. A method of measuring thyroxine in a serum sample comprising:
   a. diluting said serum sample from about 1.5 to about 6 times its original volume with a nonionic aqueous diluent;
   b. extracting thyroxine from said diluted serum sample of step (a) with an organic solvent;
   c. separating the extracted thyroxine from said organic solvent;
   d. equilibrating a buffer solution of said extracted thyroxine with known amounts of thyrobinding globulin and a radioactive isotope labeled thyroxine;
   e. thoroughly admixing the equilibrated solution of step (d) with a sorbent materail to remove free thyroxine therefrom;
   f. separating said sorbent material from the resulting solution; and
   g. counting with a scintillation well counter one of
      1. free labeled thyroxine removed from said sorbent, and
      2. labeled thyroxine remaining in said solution.

6. The method of claim 5 wherein said nonionic aqueous diluent is distilled water.

7. The method of claim 5 wherein said extracting in step (c) comprises adding sufficent organic solvent to said diluted serum to yield a final organic solvent concentration therein of at least about 60 percent by volume.

8. The method of claim 7 wherein said sorbent material is a particulate, inorganic crystalline sorbent material which is selected from silicic acid and carbonates, phosphates, oxides, hydroxides, silicates, aluminates, and sulfates of the metallic elements of Groups IA, IIA, IIIA, IIB, and VIII of the Periodic Table, and mixed salts thereof.

9. The method of claim 8 wherein said nonionic aqueous diluent is distilled water.

10. The method of claim 9 wherein said organic solvent is an alcohol.

11. The method of claim 10 wherein said organic solvent comprises at least 90 percent ethanol.

12. In a method of determining the amount of thyroid hormone in a serum sample whereby the thyroid hormone is initially extracted from said sample with a solvent, and then removed from said solvent, and thereafter admixed with known amounts of thyrobinding globulin and a radioactive isotope labeled thyroid hormone, and then the resulting mixture is contacted with a sorbent material to remove free thyroid hormone therefrom and either the solvent or the remaining supernatant is counted in a scintillation counter, the improvement comprising:

stabilizing the amount of recovered thyroid hormone from said serum by diluting said serum from about 1.5 to about 6 times its initial volume with a nonionic aqueous dilutent and thereafter extracting said thyroid hormone by adding sufficient organic solvent to the diluted serum to yield a final organic solvent concentration therein of at least about 60 percent by volume.

13. The method of claim 12 wherein said nonionic aqueous diluent is distilled water.

14. The method of claim 13 wherein said organic solvent is an alcohol.

15. The method of claim 14 wherein said organic solvent comprises 90 percent ethanol.

* * * * *

UNITED STATES PATENT OFFICE
CERTIFICATE OF CORRECTION

Patent No. 3,775,615            Dated November 27, 1973

Inventor(s) ANNA M. EISENTRAUT

It is certified that error appears in the above-identified patent and that said Letters Patent are hereby corrected as shown below:

Column 4, line 55, "globuline" should read -- globulin -- . Column 5, line 45, "nontromite" should read -- nontronite -- ; line 46 "...$xH_2o$" should read -- ...$xH_2O$ -- ; line 52, (second occurrence) "$(AlSi_3P_{10})$" should read -- $(AlSi_3O_{10})$ -- ; line 69, "particular" should read -- particulate -- .

Signed and sealed this 20th day of August 1974.

(SEAL)
Attest:

McCOY M. GIBSON, JR.           C. MARSHALL DANN
Attesting Officer             Commissioner of Patents